United States Patent [19]
Dunn

[11] Patent Number: 5,883,948
[45] Date of Patent: Mar. 16, 1999

[54] METHOD FOR AUTOMATIC MAINTENANCE OF A LOCAL NUMBER PORTABILITY DATABASE

[75] Inventor: James Patrick Dunn, Sandwich, Ill.

[73] Assignee: Lucent Technologies Inc., Murray Hill, N.J.

[21] Appl. No.: 910,310

[22] Filed: Aug. 13, 1997

Related U.S. Application Data

[63] Continuation of Ser. No. 492,259, Jun. 19, 1995, abandoned.

[51] Int. Cl.$^6$ .............................. H04M 3/42; H04M 3/22; H04M 7/00; H04M 3/00
[52] U.S. Cl. .............................. 379/210; 379/14; 379/34; 379/220; 379/230; 379/246; 379/258
[58] Field of Search .................................. 379/12, 14, 34, 379/201, 207, 210, 211, 212, 213, 219, 220, 221, 230, 245, 246, 258

[56] References Cited

U.S. PATENT DOCUMENTS

| | | | |
|---|---|---|---|
| 2,957,047 | 10/1960 | Wennemer | 379/211 |
| 4,754,479 | 6/1988 | Bicknell | 379/207 |
| 4,933,967 | 6/1990 | Lo | 379/207 |
| 4,959,856 | 9/1990 | Bischoff et al. | 379/245 |
| 5,048,081 | 9/1991 | Gavaras et al. | 379/221 |

(List continued on next page.)

FOREIGN PATENT DOCUMENTS 0649265  4/1995  European Pat. Off. ......... H04Q 3/00

OTHER PUBLICATIONS

L. Schwartz, "A Person Communications Services Prototype Using The Advanced Intelligent Network", XIV International Switching Sypmposium, 25 Oct. 1992, ISS '92, Oct. 1992, vol. 1, B3.1, 302–306.

J. Regnier et al., Personal Communication Services –The New POTS, Globecom '90, *Conference Record*, vol. 1, 2 Dec. 1990, pp. 402B.5.1–402B.5.7.

M. Hoshii et al., "Functional Reference Model For Universal Personal Telecommunication Service Studied By Considering Three Mobilities", *IEICE* Transactions, vol. E74, 11 Nov. 1991, pp. 3719–3725.

Laurie Schwartz, "Personal Communications Services Prototype Using The Advanced Intelligent Network", *International Switching Symposium*, Oct. 1992, vol. 1, pp. 302–306.

J. Regnier et al., "Personal Communcation Services –The New POTS", *Globecom '90 IEEE Global Telecommunications Conference & Exhibition*, Dec. 1990, pp. 420–426.

Motoo Hoshi et al., "Functional Reference Model for Universal Personal Telecommunication Service Studied by Considering Three Mobilities", *IEICE Transactions*, vol. E 74, No. 11, Nov. 1991, Tokyo, Japan, pp. 3719–3725.

*Primary Examiner*—Harry S. Hong
*Attorney, Agent, or Firm*—Mony R. Ghose

[57] ABSTRACT

A method for automatically updating a central local number portability (LNP) database shared among a plurality of central office switches is instigated when a message from a provisioning system to add a directory number is received by a central office switch. In response to the message, a first central office switch accesses the central LNP database by sending a query message which contains the directory number to be added and routing data specific to the central office switch. Responsive to the query message, the LNP database searches for the directory number received from the first central office switch. If the directory number is found, the database queries a second central office switch to determine if the directory number is in use. If the number is in use, the central LNP database returns a failure message to the first central office switch. If the directory number is not found in the central LNP database or if the directory number is not being used by the second central office switch, the directory number and routing data received from the first central office switch and a transaction entry are added to a table corresponding to the first central office switch in the database.

12 Claims, 2 Drawing Sheets

U.S. PATENT DOCUMENTS

| | | | |
|---|---|---|---|
| 5,222,125 | 6/1993 | Creswell | 379/201 |
| 5,237,604 | 8/1993 | Ryan | 379/220 |
| 5,247,571 | 9/1993 | Kay | 379/112 |
| 5,251,248 | 10/1993 | Tokunaga | 379/220 |
| 5,353,331 | 10/1994 | Emery | 379/207 |
| 5,384,831 | 1/1995 | Creswell | 379/114 |
| 5,418,844 | 5/1995 | Morrisey | 379/216 |
| 5,440,541 | 8/1995 | Iida | 379/57 |
| 5,481,603 | 1/1996 | Guitierrez | 379/201 |
| 5,483,586 | 1/1996 | Sussman | 379/201 |
| 5,509,058 | 4/1996 | Sestak | 379/279 |
| 5,515,427 | 5/1996 | Carlsen | 379/207 |
| 5,598,464 | 1/1997 | Hess et al. | 379/230 X |
| 5,625,681 | 4/1997 | Butler, II | 379/230 X |
| 5,689,555 | 11/1997 | Sonnenberg | 379/211 X |
| 5,732,131 | 3/1998 | Nimmagadda et al. | 379/211 |

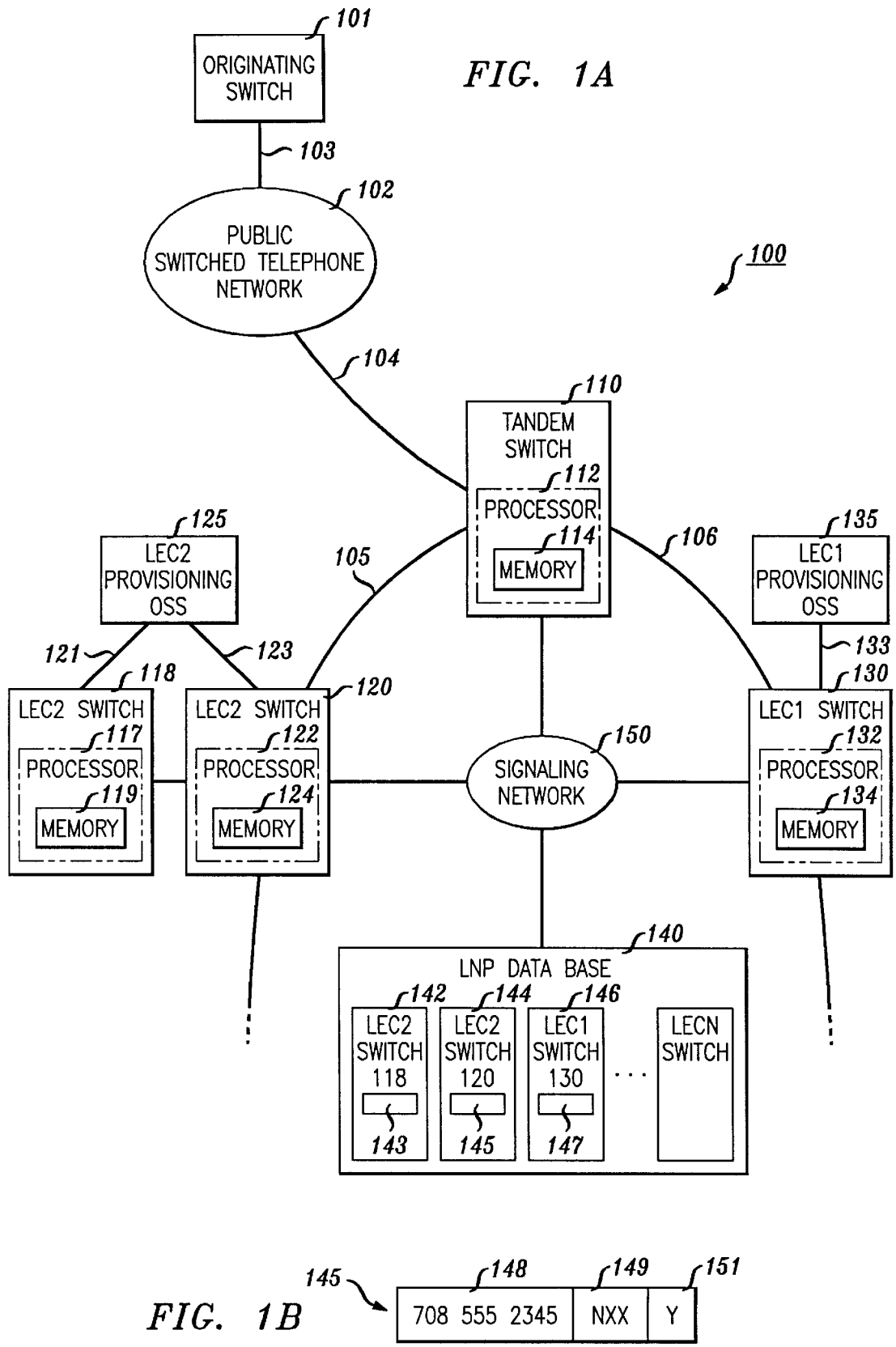

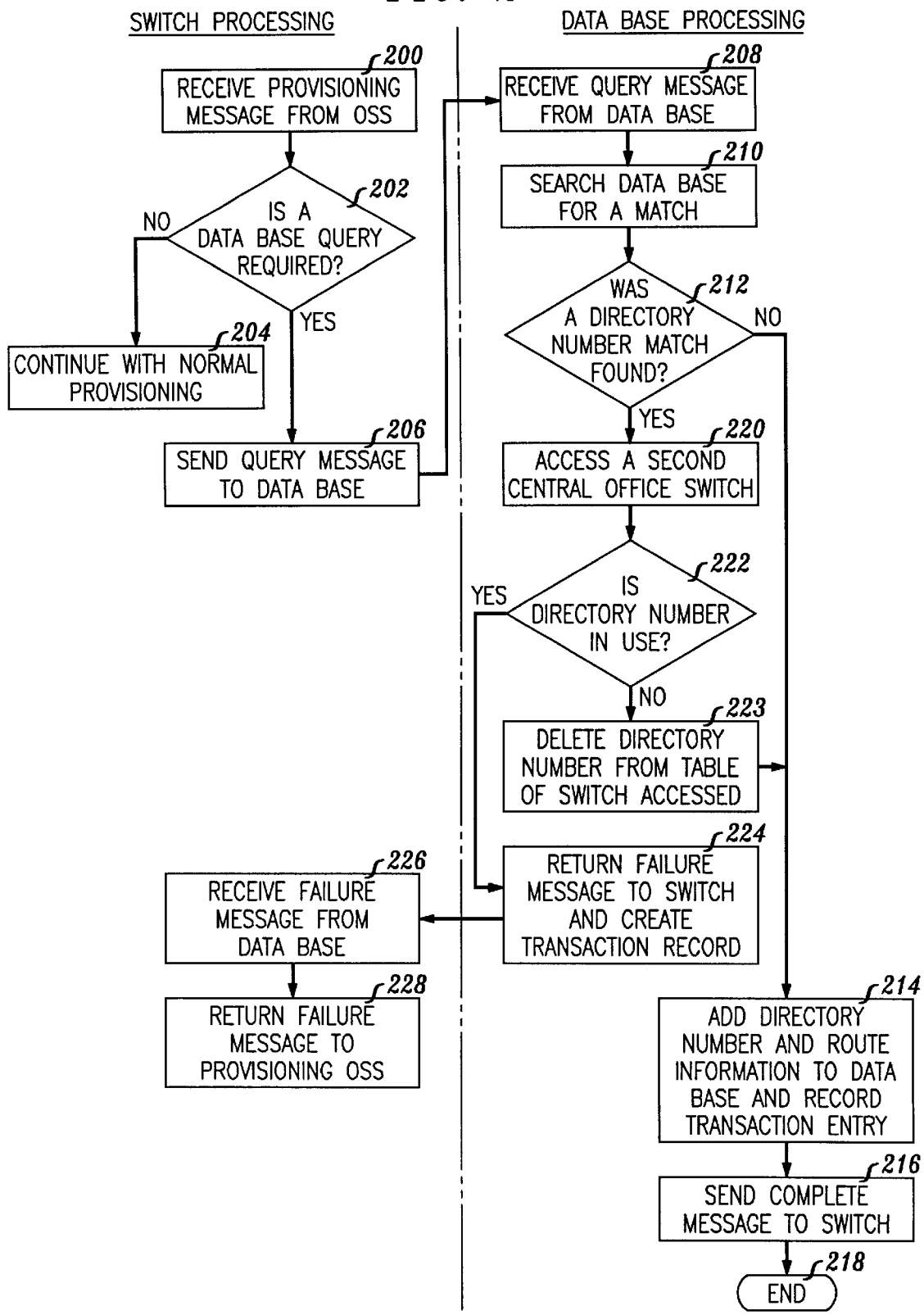

METHOD FOR AUTOMATIC MAINTENANCE OF A LOCAL NUMBER PORTABILITY DATABASE

This application is a continuation of application Ser. No. 08/492,259, filed on Jun. 19, 1995 now abandoned.

FIELD OF THE INVENTION

This invention relates to the field of telecommunications and, more particularly, to maintaining a database for routing incoming calls to a directory number served by a particular central office switch which does not traditionally serve that directory number.

BACKGROUND OF THE INVENTION

To meet the demands of an increasingly telephone-dependent public, the telecommunications industry continually develops advanced systems to enhance the efficiency and reliability of telecommunications service. As a result, it is quite common for customers to request new service features which may require transferring the customer's telephone line from one central office switch to another. Such a line transfer ordinarily implies a change in the customer's directory number since a particular range of directory numbers traditionally correspond to a particular central office switch. Each central office switch historically serves only one or more blocks of directory numbers, wherein each block has a unique office code. In the North American Numbering Plan, the 10 digit number is the area code ("NPA") followed by an office code (generally referred to as "NXX") followed by four other digits. For example, the office code for the directory number "708-555-2345" is "555". When a customer line associated with a given directory number is transferred from a first switch to a second switch, the customer's current office code is absent from the blocks of office codes conventionally served by the second switch. Normal practice in such a case would require a directory number change.

More than ever, society relies on telephone-related services to sustain businesses, meet civic responsibilities and maintain personal relationships. A telephone number (i.e. directory number) is no longer viewed as a disposable series of ten digits which are used for quick access to a particular individual. Indeed, some businesses use the power of directory number recognition to gain a competitive advantage (e.g. an extermination service which can be reached at directory number "708-555-BUGS").

Accordingly, many customers, especially business customers who have accrued good will using a particular directory number, want to avoid the inconveniences associated with a directory number change when changing central offices. To accommodate such customers, systems exist which properly route incoming calls to customers who have "non-traditional" directory numbers. A non-traditional directory number is a telephone number which retains an office code characteristic of a first central office switch while the customer line identified by the directory number is actually served by a second central office switch. One exemplary embodiment of such a system is a database which stores routing data for non-traditional directory numbers as disclosed in U.S. Pat. No. 5,237,604 to Deirdre Hoesl entitled "Arrangement for Serving a Telephone Office Code from Two Switching Systems" which issued on Aug. 17, 1993 (hereinafter, the Hoesl patent). The Hoesl patent describes a central database which may be accessed by a plurality of switches for routing data pertaining to non-traditional directory numbers.

An important reason for implementing the central database disclosed in the Hoesl patent is reflected by the dynamic nature of the local telecommunications industry. As the monopoly held by local exchange carriers becomes competitive, it is anticipated that the traditional relationship between a directory number and a central office switch, in which the directory number includes an office code corresponding to an office code of the central office switch by which it is served, will become obsolete. It is now common practice to rapidly recycle directory numbers when the number of new customer lines being added to the service base of a central office switch exceeds the number of available unused directory numbers. A recycled directory number is telephone number previously used to identify a customer line which has since been disconnected. Since there is now no guarantee that the directory numbers available for recycling will contain an office code which corresponds to an office code of the central office switch for which it is needed, recycled directory numbers are often non-traditional directory numbers. Further, local service competition will induce some customers to change from one LEC to another resulting in inter-carrier customer line transfers among switches and an even greater use of non-traditional directory numbers.

Maintenance of a central database which stores all routing data associated with non-traditional directory numbers in a local telecommunications network (i.e. a local number portability (LNP) database) is currently the responsibility of a single local exchange carrier. The LNP database is manually updated in response to circumstances such as when a customer who wants to retain a current directory number requests a service feature which is not available on the customer's current central office switch. The conventional LNP database update process requires a service order technician who receives the customer request requiring a switch transfer to notify an LNP database technician of the customer's directory number, current switch identification and new switch identification; this is currently communicated via facsimile. Upon receipt of the facsimile, the LNP technician manually enters the customer's directory number and corresponding routing data (which is based on the new central office switch identification) into an appropriate table in the central LNP database. The routing data allows incoming calls to the customer's directory number to be delivered to the central office switch which actually serves the directory number, even though the office code of the directory number actually identifies another central office switch. A similar LNP database update procedure also occurs when a new customer line, identified by a recycled non-traditional directory number, is added to the service base of a switch.

As described above, the current LNP database update procedure is labor-intensive, time-consuming and prone to error because of all of the manual actions required even for an individual telephone line transfer among the switches of a single LEC. The added administrative burden of manually coordinating routing data updates for directory numbers among central office switches for multiple LECs will result in even greater inefficiencies and error rates. Further, with multiple LECs using the LNP database, new concerns relating to fraudulent or unauthorized data changes in the LNP database must be addressed. Therefore, there is a need in the art for automatically keeping records, updating data changes and maintaining the integrity of a central LNP database such that incoming calls may be properly delivered to those customer lines which are identified by non-traditional directory numbers.

SUMMARY OF THE INVENTION

This need is addressed and a technical advance is achieved in the art by a method in which a central office switch automatically updates routing data in a LNP database whenever a new directory number is added to the service base of the switch.

In one preferred embodiment of the method and system of the present invention, each central office switch interacts with a central LNP database during an automatic update process which is instigated by a provisioning operation support system (OSS) supporting the switch. Specifically, upon receiving a provisioning message to add a "non-traditional" directory number to its service base, a first central office switch accesses the central LNP database via a signaling network using a protocol stored in the switch processor. The central office switch queries the database to determine if the directory number to be added to its service base (as received from the provisioning OSS) is currently present in the database. If the directory number in question does not currently exist in the LNP database, the directory number and corresponding routing data is added to an appropriate table in the LNP database.

If the directory number currently exists in the LNP database, a second switch associated with the directory number is accessed and interrogated by the database to determine if the directory number is currently active. If the directory number is active, the second switch returns a failure message to the LNP database. The LNP database then notifies the first central office switch of the failure. If the directory number is determined to be inactive, its association with the second central office switch is deleted from the LNP database and the directory number and routing data as received from the first central office switch is added to an appropriate table in the LNP database. A transaction entry which identifies the central office switch accessing the LNP database for updating purposes is recorded for LEC accountability such that the integrity of the database is maintained.

BRIEF DESCRIPTION OF THE DRAWINGS

FIG. 1A is a simplified block diagram representing a local telecommunications market in which the present invention may be practiced;

FIG. 1B is a representation of a LNP database entry as shown in FIG. 1A; and

FIG. 2 is a flow diagram of the method steps for controlling an automatic LNP database update as performed by a central office switch in accordance with a preferred embodiment of the present invention.

DETAILED DESCRIPTION

FIG. 1A is a block diagram of local telecommunications market 100 which is defined as a collective group of telephone customers in a particular geographic region. In this particular market, there are two distinct local exchange carriers (LECs), namely LEC1 and LEC2, that provide competitive local telecommunications services. Each LEC maintains its own central office switch(es) and provisioning operating support system (OSS) which serves the switch(es). Specifically, analog central office switch 118 and digital central office switch 120 serve the customers of LEC2 and are supported by provisioning OSS 125 via data links 121 and 123, respectively. Central office switch 130 serves the customers of LEC1 and is supported by its provisioning OSS 135 via data link 133. Although a minimal number of central office switches are shown, it is to be understood that an operational LEC may maintain many more central office switches. Also shown is tandem switch 110, including processor 112 and memory 114. Tandem switch 110 serves all the central office switches in local market 100 and acts as a conduit for all incoming calls to the switches of local market 100, as described in more detail below.

Each central office switch includes a service base comprising a plurality of customer lines (not shown), wherein each line is identified by a unique directory number. In local telecommunications market 100, the directory numbers served by a particular central office switch may or may not include an office code which matches the code identification of the switch. All switches are equipped with a processor to administer global control programs and a memory for storing customer line data and other information required for the proper functioning of the switch, as is known in the art. Specifically, central office switch 118 includes processor 117 and memory 119, central office switch 120 includes processor 122 and memory 124 and central office switch 130 includes processor 132 and memory 134. Processors 117, 122 and 132 include a program defining a protocol for updates to a LNP database, as described in detail below. Also shown is originating switch 101 which is connected to the public-switched telephone network (PSTN) 102 via trunk group 103.

Central LNP database 140 stores and updates routing data associated with non-traditional directory numbers in local telecommunications market 100. LNP database 140 is accessed by all switches in local market 100 via signaling network 150. Signaling network 150 comprises a plurality of signal transfer points as described in *The Bell System Technical Journal*, Vol. 16, No. 7, Part 3, September 1982, pages 1573–1816, and especially pages 1579–1654. The database 140 is comprised of a plurality of tables, each table corresponding to a central office switch in local market 100. In the embodiment shown in FIG. 1A, table 142 corresponds to central office switch 118, table 144 corresponds to central office switch 120 and table 146 corresponds to central office switch 130. Tables 142, 144 and 146 include at least one entry (such as entry 143, 145 and 147, respectively) which correspond to a non-traditional directory number.

FIG. 1B is a representation of the information contained in exemplary LNP database entry 145. Entry 145 includes non-traditional directory number segment 148 which is shown as "708-555-2345", its corresponding routing data segment 149 which is represented by the office code "NXX" (different from the "traditional" office code, "555") and transaction record segment 151 represented by the letter "Y". A transaction entry such as the entry "Y" is recorded each time directory number "708-555-2345" is accessed by a central office switch for updating purposes and includes central office switch identification data. The compilation of all transactions entries (a transaction record) is maintained for each table entry so that any LEC which has accessed the database for an update can be readily identified. Central office switch identification and LEC accountability for updates creates an internal auditing entry that prohibits fraudulent or unauthorized data changes in the LNP database.

A brief overview of the operation of central LNP database 140 in response to the delivery of an incoming call to a switch which serves a group of telephone customers in local market 100 is exemplified by the following scenario: A caller who is served by originating switch 101 places a call to a party who has changed local service providers and thus, whose telephone line has been transferred from central office switch 130 to central office switch 120. Assume that the party has also elected to retain a current directory number of "708-555-2345". The call is delivered from switch 101 via trunk group 103 to PSTN 102. Tandem switch 110 receives the incoming call from PSTN 102 over trunk group 104. A protocol stored in processor 112 of tandem switch 110 requires an LNP database query for each incoming call. Accordingly, tandem switch 110 accesses LNP database 140 via signaling network 150 and sends a query message to database 140. The query message includes the called directory number "708-555-2345" and questions the database as to whether the number is non-traditional and requires special routing data to complete the delivery of the call.

In response to the query message, database 140 searches all of its tables for called directory number "708-555-2345". If, as in this case, the called directory number is a non-traditional number, the directory number and its corresponding routing data will be found as an entry in a table. In this example, directory number "708-555-2345" is found as entry 145 in table 144 which corresponds to switch 120. Database 140 reads routing data segment 149 and returns routing code "NXX" to tandem switch 110. Upon receiving routing code "NXX", tandem switch 110 forwards the incoming call, via trunk group 105, to the central office switch identified by the code "NXX" (i.e. central office switch 120). The successful delivery of the incoming call from originating switch 101 to the desired party is dependent upon the accuracy of the routing data stored in LNP database 140.

FIG. 2 shows a flow diagram of the method steps performed by central office switch 120 for controlling an automatic LNP database update process for the directory number "708-555-2345" in accordance with the present invention. For clarity, the above example of a party who has transferred local telephone service from LEC1 to LEC2 is continued. However, a similar process also occurs if a customer line is transferred from a first switch to a second switch without a change in local service provider (e.g. a customer whose telephone line is transferred from analog central office switch 118 to digital central office switch 120). The process described below occurs before incoming calls can be delivered to the new customer line served by switch 120.

As a historical perspective to the process described below, assume that the party previously served by LEC1 wants to set up a state-of-the-art home office. He is contacted by a LEC2 service representative who explains the advantages of integrated services digital network (ISDN) service, such as facsimile capabilities and enhanced computing power. The LEC2 representative suggests that the party transfer his customer line so that it may be served by a LEC2 digital central office switch capable of providing ISDN service. As a result, the party decides that ISDN service is desirable, cancels his current account with LEC1 and elects LEC2 as his new local exchange carrier with the understanding that he will have access to ISDN service but that his directory number of "708-555-2345" will not change. To accommodate the party's request, the LEC2 service representative enters an order for a new customer telephone line with directory number "708-555-2345" to be added to the service base of digital central office switch 120. The new customer line order is received by provisioning OSS 125 of LEC2.

The automatic update process of the present invention begins in step 200 in which switch 120 receives a provisioning message from provisioning OSS 125 over data link 123. The provisioning message is a request to add directory number "708-555-2345" to the service base of switch 120. The process continues to decision step 202 in which switch 120 determines whether a database query is required to process the message received from OSS 135. Generally, a database query is necessary for all messages which require the addition of a new directory number to a switch service base. If the outcome of decision step 202 is a "NO" decision, as is the case when the directory number includes an office code which matches the office code identification of the switch by which it is served (i.e. a "traditional" directory number), the process continues to step 204 in which switch 120 processes the message using normal provisioning. In this example, however, the outcome of decision step 202 is a "YES" decision, since a database query is necessary and the process continues to step 206 in which switch 120 sends a query message including directory number "708-555-2345" and routing data "NXX" (specific to central office switch 120) to database 140 via signaling network 150. The query message requires database 140 to search for a match with directory number "708-555-2345".

In step 208, database 140 receives the query message sent by switch 120 in the previous step. The process continues to step 210 in which database 140 searches all of its tables for a match with the directory number ("708-555-2345") received from the switch. In decision step 212, a determination is made as to whether a match was found. If the outcome of decision step 212 is a "NO" decision (that is, the directory number "708-555-2345" is not found in the database), database 140 adds the information by creating an entry including the directory number and routing data received from switch 120 in a table corresponding to the central office switch in step 214. In this example, entry 145 including directory number segment 148 ("708-555-2345") and routing data segment 149 ("NXX") is created and added into LEC2 switch 120 table 144 of LNP database 140. A transaction entry segment 151 ("Y") is also recorded to indicate that LNP database 140 was accessed by central office switch 120 with regard to directory number "708-555-2345". In step 216, the database returns an update complete message to central office switch 120 and the process ends in step 218.

Alternatively, if the outcome of decision step 212 is a "YES" decision, (that is, directory number "708-555-2345" is present in the database), the routing data for "708-555-2345" cannot be immediately added as an entry to the database. For example, if the directory number "708-555-2345" were a recycled directory number when it was served by the other central office switch (i.e. central office switch 130), it would exist as a non-traditional directory number entry in table 146. If the directory number "708-555-2345" currently exists in the database, the process continues to step 220, in which database 140 accesses the other switch currently associated with the directory number "708-555-2345" (central office switch 130) via signaling network 150 to determine whether the number is still active or in use. In decision step 222, a determination is made as to whether the response received at the database from the other switch is a "YES", indicating that the number is active or "NO", indicating that the number is not active. If the outcome of decision step 222 is a "YES" decision (the directory number is active), database 140 returns a failure message to central office switch 120 in step 224 indicating that this particular directory number cannot be added to its service base. In process step 226, central office switch 120 receives the failure message from database 140 and returns a failure message to provisioning OSS in step 228.

If the outcome of decision step 222 is a "NO" decision (the directory number is inactive), however, the directory number "708-55-2345" is deleted from the table corresponding to the other switch (in this example, table 146 corresponding to central office switch 130) in step 223. The process then continues to step 214 in which the directory number, routing data and transaction entry are added to an appropriate table in the database. The database then returns an update complete message to the central office switch in step 216 and the process ends in step 218.

The above-described method automates directory number routing data updates in a central LNP database and thereby, decreases the administrative burden associated with maintenance and coordination of routing information among a plurality of central office switches and LECs which service a local telecommunications market. A transaction record including an entry of each time a central office switch accesses the LNP database provides an audit trail useful in maintaining the integrity of the database. It is to be understood that the above-described embodiment is for illustrative purposes only and that numerous other arrangements of the invention may be devised by one skilled in the art without departing from the scope of the invention.

The invention claimed is:

1. In a telecommunications system including a plurality of central office switches and a central database for maintaining ported directory number routing data, a method for populating the central database comprises:

a central office switch receiving a provisioning message from a provisioning system located within the telecommunications system;

a central office switch, in response to receiving the provisioning message, sending a query message including a directory number to be added to service base;

determining whether the directory number to be added to the service base of the central office switch currently exists in the central database; and entering the directory number and its associated routing data in the central database responsive to a determination that the directory number does not currently exist in the central database.

2. The method of claim 1 wherein the central database contains a table for each of said plurality of switches and the step of entering the directory number and routing data into the central database comprises:

creating an entry including the directory number and routing data in the table.

3. The method of claim 1 further comprises, in response to determining that the directory number currently exists in the database, the step of:

the central database accessing a second central office switch to determine whether the directory number is active.

4. The method of claim 3 further comprises the step of deleting an entry from a table corresponding to the second central office switch upon a determination that the directory number is not active.

5. The method of claim 1 further comprises recording a transaction entry in the central database each time a central office switch accesses the central database for update purposes.

6. In a local system served by at least two central offices, a provisioning system and a central database for storing routing information relating to directory numbers served by the central office switches, a method for updating the central database comprises:

a first central office switch receiving a message from the provisioning system over a first data link, the message requesting that the first central office switch add a directory number to its service base;

the first central office sending a query message over a signaling network shared by a plurality of central office switches, wherein the query message includes the directory number to be added to the service base of the first central office switch and its associated routing data; and the first central office switch receiving a message over the signaling network in response to the query message wherein the received message relates to updating routing data in the central database.

7. The method of claim 6 further comprises:

the first central office switch establishing that the message received from the provisioning system does not require a query.

8. The method of claim 6 wherein the step of the first central office switch receiving a message over the signaling network from the central database in response to the query message comprises:

receiving a failure message when no update has occurred.

9. The method of claim 6 further comprises:

creating table entries including the directory number and routing data specific to the first central office switch; and sending an update complete message to the first central office switch.

10. The method of claim 6 further comprises, in response to a determination that the directory number to be added matches a directory number which currently exists, the step of:

accessing a second central office switch over the signaling network to determine if the directory number is active.

11. The method of claim 6 further comprises:

recording a transaction entry for each update.

12. In a telecommunications system served by a plurality of central office switches wherein directory numbers may be ported among the central office switches, a method for maintaining routing data relating to ported directory numbers comprising:

a central office switch receiving provisioning data from a provisioning system located within the telecommunications system; and the central office switch extending the provisioning data to a central database which is located outside of the switch for update purposes.

\* \* \* \* \*